No. 620,987. Patented Mar. 14, 1899.
C. P. STEINMETZ.
FREQUENCY CHANGER.
(Application filed Jan. 31, 1895.)
(No Model.)
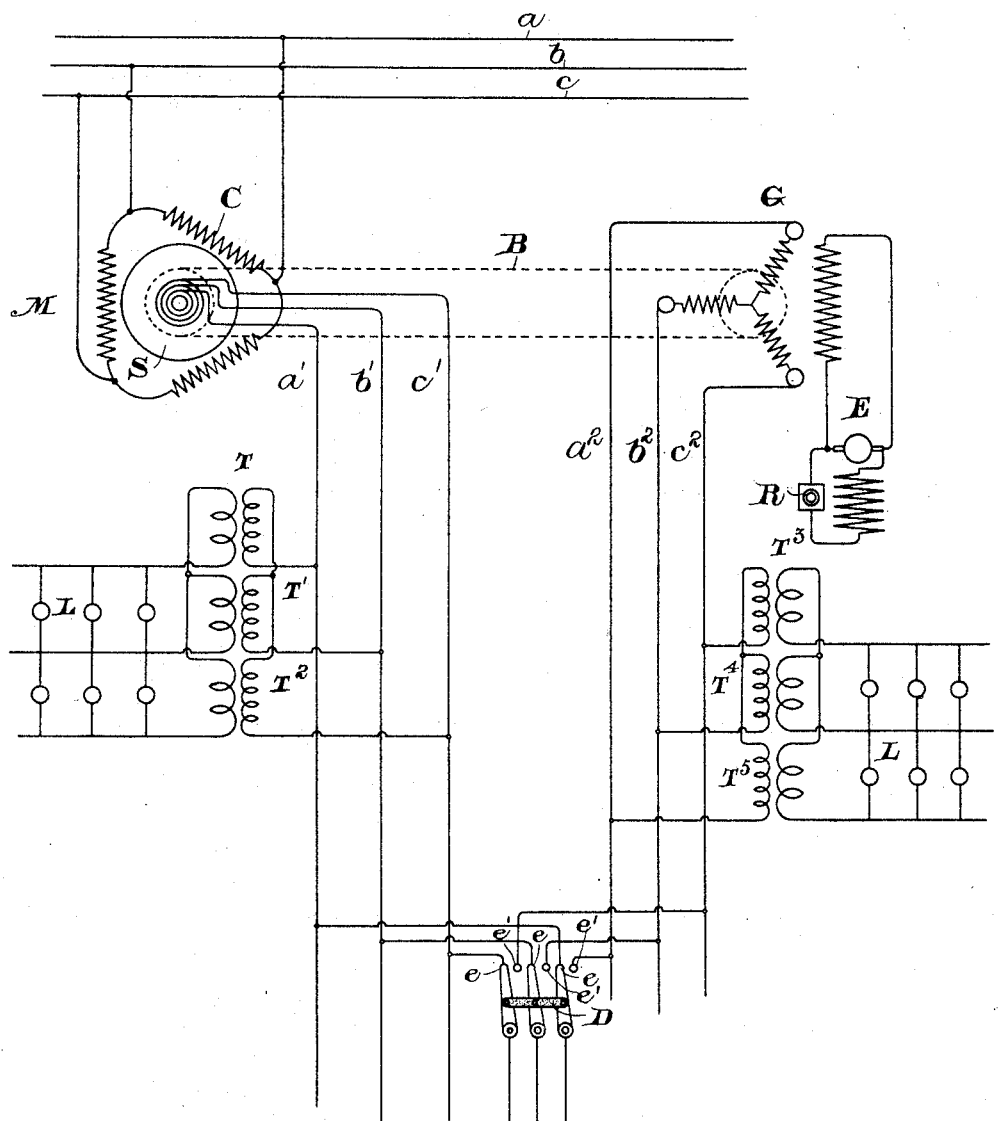

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

FREQUENCY-CHANGER.

SPECIFICATION forming part of Letters Patent No. 620,987, dated March 14, 1899.

Application filed January 31, 1895. Serial No. 536,873. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Systems of Electrical Distribution, of which the following is a specification.

The present invention relates to alternating-current systems of distribution, and especially to the arrangement of a phase-changer, whereby from any given circuit other circuits may be derived in which the frequency of the alternating currents bears any desired relation to the frequency in the main supply-circuit.

The invention also comprises certain novel arrangements for regulating the speed of alternating motors, as hereinafter set forth.

In the accompanying drawing there is shown in diagram a system of distribution illustrating typical forms of the various features comprised in this invention.

In the drawing, $a\ b\ c$ represent the mains of a three-phase system of well-known character, which is selected for illustration, though the invention is equally applicable to distribution systems in which the currents have any other desired phase relation. The mains $a\ b\ c$ are supposed to be part of a circuit or distribution system connected to any suitable generator maintaining on the mains electromotive forces displaced one hundred and twenty degrees in phase. The phase-changing apparatus forming one feature of the invention comprises an induction-motor or "rotating transformer," as it is sometimes otherwise called, having primary coils C connected in delta or Y in the usual manner. The drawing illustrates the delta connection. The secondary S of the motor is constructed in any well-known way, the secondary winding being connected by collector rings and brushes with the circuit $a'\ b'\ c'$. Mounted on the same shaft with the secondary of the motor or geared thereto in any desired manner, as represented by the belt B, is an alternating generator G. This is shown as a three-phase generator whose armature-terminals lead to a circuit $a^2\ b^2\ c^2$ and whose field-coils are supplied with current by a direct-current exciter E. This exciter is made regulable, so as to vary the field excitation of the generator G. For this purpose many suitable arrangements are well known. The drawing illustrates a shunt-wound exciter, having a variable resistance or rheostat R in the shunt-circuit. Translating devices of any desired nature may be operated from the circuits $a'\ b'\ c'$ and $a^2\ b^2\ c^2$. There are illustrated groups of lamps L, fed from the circuit $a'\ b'\ c'$ by transformers T T' T² and from the circuit $a^2\ b^2\ c^2$ by transformers T³ T⁴ T⁵.

With the arrangement thus far described it is evident that the motor M will be driven after the manner of any ordinary induction-motor, and the energy supplied thereto will be divided partly into electrical energy induced in the secondary circuit of the motor, in which the electromotive forces will have the same phase relation that exists on the primary side, but a different frequency. The remaining portion of the supplied energy is converted into mechanical energy, which is consumed by the motor in driving the generator G, and by the generator is again reconverted into electrical energy fed to the circuit $a^2\ b^2\ c^2$. By regulating the generator in the manner explained already or in other well-known ways the mechanical energy consumed by the motor may be made greater or less and the speed of the motor controlled in this manner. The frequency of the currents in the circuits $a'\ b'\ c'$ and $a^2\ b^2\ c^2$ will depend upon the speed of the motor, and in the generator-circuit the frequency will also depend upon the number of poles given the generator. Assuming, for illustration, that the motor is loaded so as to run at half-speed, then the frequency in the circuit $a'\ b'\ c'$ will be substantially one-half that upon the main supply-circuit $a\ b\ c$. By giving the generator a proper number of poles the frequency in $a^2\ b^2\ c^2$ may be the same. If now the running conditions be such that the mechanical load driven by the motor M be small and its speed consequently high, the frequency in circuit $a'\ b'\ c'$ will be low under the conditions assumed relatively to that in the circuit $a^2 b^2 c^2$. If now the mechanical load of the motor be increased, the speed will diminish, increasing the frequency in circuit $a'\ b'\ c'$, but decreasing the frequency in the circuit $a^2\ b^2\ c^2$. In this manner the frequency in either of the circuits can be regulated, and for this reason I term the arrangement of apparatus a "regulable frequency-changer."

A second induction-motor M' of any ordinary description is shown coupled to circuit $a'\ b'\ c'$ by a three-arm switch D, and the method of regulating this motor forms another feature of the invention. The speed at which such a motor will run, or, in fact, any alternating-current motor, whether of the synchronous or induction type, is controlled, as is well known, by the frequency of the currents supplied to it. In other words, I mean to say that it has been well known that similar alternating-current motors will run faster under given conditions when driven from a high-frequency alternator and slower when driven from a low-frequency alternator, and this knowledge is availed of in the present arrangement, where in order to regulate the speed of the motor corresponding regulation is made in the frequency of the currents supplied to it. It has already been explained how the frequency in circuit $a'\ b'\ c'$ may be regulated, and by using, as I propose to do, such a regulable phase-changer intermediate between the regulated motor or motors and the main source of supply, where the frequency is constant, corresponding changes in speed are secured in the motors. To render the control of the motor still more flexible, there are provided resistance-coils $R'\ R^2\ R^3$, more or less of which can be introduced in the secondary circuit of the motor by any suitable arrangement of switching mechanism. For this purpose I have shown a three-arm switch D', the arms of which are connected to the secondary terminals of the motor and which are adapted to engage contacts $r\ r'\ r^2$, &c., joined to successive points in the resistances. This arrangement is in itself well known in the art and will be understood without further description. The switch D is also arranged so as to transfer the motor from the circuit $a'\ b'\ c'$ to the circuit $a^2\ b^2\ c^2$. When the switch is in the position shown, engaging contacts $e\ e\ e$, the motor is connected with circuit $a'\ b'\ c'$; but when thrown so as to engage with contacts $e'\ e'\ e'$ the motor will be connected with the second one of the circuits mentioned. This arrangement affords a practicable means for regulating the speed of one or more motors within quite wide limits. Assume, for example, that the frequency on circuit $a'\ b'\ c'$ is low relatively to that on circuit $a^2\ b^2\ c^2$. For the lowest speed of motor M' it will be connected with the former circuit and may be regulated within limits by the resistances $R'\ R^2\ R^3$ or by regulating the frequency-changer so as to alter the frequency on the primary side. For higher speeds the motor will be transferred to the circuit $a^2\ b^2\ c^2$ and again regulated within limits in the ways previously mentioned.

When the speed of the motor M' is to be regulated by the regulation of the phase-changer—that is to say, by varying the speed of the phase-changer and therefore the frequency of the currents supplied to the motor—it will be convenient to place the rheostat R or other means for regulating the phase-changer at or near the motor to be regulated. It will be noticed that when the motor M is retarded in order to vary the frequency of the current on the circuit $a'\ b'\ c'$ the energy consumed by the retardation is not wasted, but is utilized and converted into electric current in the circuit of the generator G.

It is obvious that many changes may be made without departing from the spirit of my invention, and it is my intention to cover any such changes and any mere reversal by the following claims in addition to the forms and uses shown and described.

What I claim as new, and desire to secure by Letters Patent, is—

1. The method of changing the frequency of alternating-current circuits, or systems, which consists in supplying currents of given frequency to the primary of an induction or transformer motor maintained in rotation at a speed different from that corresponding to the frequency of the supplied currents; feeding one circuit with currents induced in the secondary of the motor, and a second circuit with currents, generated in a generator mechanically coupled with the motor, and representing the mechanical energy consumed by the motor, as set forth.

2. The method of changing the frequency of alternating-current circuits or systems, which consists in supplying alternating currents of given frequency to the primary of an induction-motor, which divides the initial energy, first, into alternating currents of different frequency induced in the secondary member of the motor, and second, into mechanical energy; reconverting the whole or a portion of the mechanical energy into alternating currents, and feeding separate circuits with the currents induced in the motor, and those reconverted from mechanical into electrical energy.

3. The method of operating an alternating-current motor at different speeds, which consists in generating alternating currents, supplying them to a frequency-changer, supplying current from the frequency-changer at a plurality of different frequencies on a plurality of different secondary circuits, varying the frequency of the currents on said secondary circuits, and shifting the motor from one to another of said circuits.

4. The method of changing the frequency of alternating-current circuits, or systems, which consists in converting electrical energy, in the form of alternating currents of given frequency, by a frequency-changer, into currents of different frequency in two or more electric circuits, and regulating the frequency-changer so as to vary the relative frequencies in the last-named circuits.

5. The method of operating variable-speed alternating-current motors, which consists in deriving from a given distribution system by a frequency-changer, two or more circuits of different frequencies, and transferring the motor or motors to be regulated from one to the other of such circuits in accordance with the speed desired, as set forth.

6. The combination of an induction-motor connected to an alternating-current circuit, a generator geared thereto, separate circuits for operating translating devices connected respectively with the generator and the secondary of the motor, and means for regulating the amount of mechanical energy consumed by the motor in driving the generator.

7. The herein-described means for changing the frequency of alternating-current circuits, consisting of an induction-motor having its primary connected with a source of alternating currents of given frequency, an alternating generator geared to the motor, and separate circuits connected respectively to the secondary of the motor and with the generator driven thereby.

8. The combination of an induction-motor, an alternating generator geared thereto, with separate circuits leading from the secondary of the motor and from the generator-terminals, an alternating-current motor, and a switch for transferring the motor from one to another of said circuits, as set forth.

9. The combination of a source of alternating currents, a frequency-changer, a plurality of secondary circuits from the frequency-changer carrying currents of different frequencies, a translating device, and means for transferring the translating device from one to another of said secondary circuits.

10. The combination of an alternating-current-supply system, a frequency-changer, a plurality of secondary circuits leading from different points on said frequency-changer, such that currents of more than one frequency may exist at the same time on the secondary circuits, and means for varying the frequency of said currents.

11. The combination of a plurality of dynamo-electric machines, each adapted to develop a polyphase current of different frequency, a single source of electrical energy for driving said machines, an energy-consuming circuit, and means for shifting the connections of the circuit from one machine to another.

In witness whereof I have hereunto set my hand this 28th day of January, 1895.

CHARLES P. STEINMETZ.

Witnesses:
B. B. HULL,
A. F. MACDONALD.